United States Patent
Digiuni

(10) Patent No.: US 10,154,753 B2
(45) Date of Patent: Dec. 18, 2018

(54) SYSTEM FOR MAKING BEVERAGES

(71) Applicant: CAFFITALY SYSTEM S.P.A., Gaggio Montano (Bologna) (IT)

(72) Inventor: Paolo Digiuni, Montagnola (CH)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 302 days.

(21) Appl. No.: 14/377,639

(22) PCT Filed: Feb. 28, 2013

(86) PCT No.: PCT/IB2013/051595
§ 371 (c)(1),
(2) Date: Aug. 8, 2014

(87) PCT Pub. No.: WO2013/136209
PCT Pub. Date: Sep. 19, 2013

(65) Prior Publication Data
US 2016/0037961 A1    Feb. 11, 2016

(30) Foreign Application Priority Data

Mar. 14, 2012 (IT) .............................. VR2012A0043

(51) Int. Cl.
*A47J 31/06* (2006.01)
*A47J 31/40* (2006.01)
(Continued)

(52) U.S. Cl.
CPC ............. *A47J 31/407* (2013.01); *A23F 5/262* (2013.01); *A47J 31/0684* (2013.01);
(Continued)

(58) Field of Classification Search
CPC .. A47J 31/407; A47J 31/0684; A47J 31/3676; A47J 31/44; A23F 5/262
(Continued)

(56) References Cited

U.S. PATENT DOCUMENTS 4,775,048 A   10/1988 Baecchi et al.
6,053,359 A    4/2000 Goulet et al.
(Continued)

FOREIGN PATENT DOCUMENTS

AU    2011309696 A1    5/2013
CA       2828915 A1    9/2012
(Continued)

OTHER PUBLICATIONS

Consumentenbond, webpage providing test results (along with English translation), Aug. 4, 2010, pp. 1-4.
(Continued)

*Primary Examiner* — Omar Flores Sanchez
(74) *Attorney, Agent, or Firm* — Pearne & Gordon LLP

(57) ABSTRACT

A system for making beverages includes a capsule and a capsule holder including an annular edge at the top of which there is a projecting annular element and/or respectively an annular seat. The capsule includes a body including a lower wall, a lateral wall and a perimetric edge on which there is an annular groove having a bottom zone and two inner lateral faces, and/or respectively there is an annular tooth having a tip portion and two outer lateral faces. The capsule holder and the capsule can adopt a sealed configuration where the projecting annular element, inserted in the annular groove, is in sealed contact with at least one of the inner lateral faces, and/or respectively the annular seat receives inside it the annular tooth and is in sealed contact with at least one of the outer lateral faces.

19 Claims, 3 Drawing Sheets

(51) Int. Cl.
  *B65D 85/804* (2006.01)
  *A47J 31/36* (2006.01)
  *A47J 31/44* (2006.01)
  *A23F 5/26* (2006.01)

(52) U.S. Cl.
  CPC ........... *A47J 31/3676* (2013.01); *A47J 31/44* (2013.01); *B65D 85/8043* (2013.01)

(58) Field of Classification Search
  USPC .................................. 99/295, 287, 279, 300
  See application file for complete search history.

(56) References Cited

U.S. PATENT DOCUMENTS

| | | | |
|---|---|---|---|
| 6,102,246 | A | 8/2000 | Goulet et al. |
| 7,993,691 | B2 | 8/2011 | Yoakim et al. |
| 8,202,560 | B2 | 6/2012 | Yoakim et al. |
| 8,512,776 | B2 | 8/2013 | Yoakim et al. |
| 8,535,743 | B2 | 9/2013 | Kamerbeek et al. |
| 8,557,314 | B2 | 10/2013 | Gerbaulet et al. |
| 8,651,012 | B2 | 2/2014 | Yoakim et al. |
| 8,734,881 | B2 | 5/2014 | Yoakim et al. |
| 8,962,048 | B2 | 2/2015 | Gerbaulet et al. |
| 9,072,402 | B2 | 7/2015 | Ryser |
| 9,102,464 | B2 | 8/2015 | Simanski |
| 9,226,611 | B2 | 1/2016 | Yoakim et al. |
| 9,271,598 | B2 | 3/2016 | Yoakim et al. |
| 9,307,857 | B2 | 4/2016 | Kamerbeek et al. |
| 9,414,709 | B2 | 8/2016 | Mariller |
| 9,415,931 | B2 * | 8/2016 | Gerbaulet ............... A47J 31/22 |
| 9,545,121 | B2 | 1/2017 | Perentes et al. |
| 9,572,450 | B2 | 2/2017 | Kollep et al. |
| 2006/0110507 | A1 | 5/2006 | Yoakim et al. |
| 2007/0141204 | A1 | 6/2007 | Xiong et al. |
| 2007/0224319 | A1 | 9/2007 | Yoakim et al. |
| 2008/0134901 | A1 | 6/2008 | Cortese |
| 2009/0126577 | A1 | 5/2009 | Ternite |
| 2009/0280219 | A1 | 11/2009 | Yoakim et al. |
| 2009/0320692 | A1 | 12/2009 | Simanski |
| 2010/0055252 | A1 | 3/2010 | Marina et al. |
| 2010/0178404 | A1 | 7/2010 | Yoakim et al. |
| 2010/0203208 | A1 | 8/2010 | Yoakim et al. |
| 2010/0239733 | A1 | 9/2010 | Yoakim et al. |
| 2011/0011271 | A1 | 1/2011 | Kollep et al. |
| 2011/0185910 | A1 | 8/2011 | Ryser |
| 2011/0236541 | A1 | 9/2011 | Gerbaulet et al. |
| 2011/0274794 | A1 | 11/2011 | Gerbaulet |
| 2011/0297005 | A1 | 12/2011 | Mariller |
| 2012/0009304 | A1 | 1/2012 | Perentes et al. |
| 2012/0180670 | A1 | 7/2012 | Yoakim et al. |
| 2012/0210878 | A1 | 8/2012 | Mariller |
| 2012/0225168 | A1 | 9/2012 | Kamerbeek et al. |
| 2012/0231123 | A1 | 9/2012 | Kamerbeek et al. |
| 2012/0231124 | A1 | 9/2012 | Kamerbeek et al. |
| 2012/0251694 | A1 | 10/2012 | Kamerbeek et al. |
| 2012/0272830 | A1 | 11/2012 | Gugerli |
| 2013/0247774 | A1 | 9/2013 | Macchiavelli et al. |
| 2013/0333575 | A1 | 12/2013 | Kamerbeek et al. |
| 2014/0170281 | A1 | 6/2014 | Zweed |
| 2014/0227414 | A1 | 8/2014 | Perentes et al. |
| 2016/0207697 | A1 * | 7/2016 | La Gamba .......... A47J 31/0684 |
| 2016/0264349 | A1 | 9/2016 | Kamerbeek et al. |

FOREIGN PATENT DOCUMENTS

| | | | | |
|---|---|---|---|---|
| CN | 101686771 | A | 3/2010 | |
| CN | 101849775 | A | 10/2010 | |
| CN | 102001496 | A | 4/2011 | |
| CN | 102245065 | A | 11/2011 | |
| CY | CA 2828915 | A1 * | 9/2012 | ............. B65D 53/02 |
| DE | 102008014758 | A1 | 10/2009 | |
| EP | 0512142 | A1 | 11/1992 | |
| EP | 0710462 | A1 | 5/1996 | |
| EP | 1654966 | A1 | 5/2006 | |
| EP | 1700548 | A1 | 9/2006 | |
| EP | 1702543 | A1 | 9/2006 | |
| EP | 1816935 | A2 | 8/2007 | |
| EP | 1816936 | | 8/2007 | |
| EP | 2230195 | A1 | 9/2010 | |
| EP | 2284101 | A1 | 2/2011 | |
| EP | 2335529 | A1 | 6/2011 | |
| EP | 2 489 609 | B1 | 8/2012 | |
| FR | 2617389 | A1 | 1/1989 | |
| JP | S62204525 | U | 12/1987 | |
| WO | 2006/045536 | A1 | 5/2006 | |
| WO | 2007/137974 | A2 | 12/2007 | |
| WO | 2008148646 | A1 | 12/2008 | |
| WO | 2008148656 | A1 | 12/2008 | |
| WO | 2009115474 | A1 | 9/2009 | |
| WO | 2010/063644 | A1 | 6/2010 | |
| WO | 201066705 | A1 | 6/2010 | |
| WO | 2010/137954 | A1 | 12/2010 | |
| WO | 2011010263 | A1 | 1/2011 | |
| WO | 2011061126 | A2 | 5/2011 | |
| WO | 2012/118367 | A1 | 9/2012 | |
| WO | 2013/132435 | A1 | 9/2013 | |

OTHER PUBLICATIONS

Declaration of Ralf Kamerbeek, Apr. 19, 2016, pp. 1-5.
Declaration of Marc Wijnen, Apr. 22, 2016, pp. 1-8.
Declaration of Ralf Kamerbeek, Oct. 27, 2016, pp. 1-46.
Declaration of Marc Wijnen, Oct. 26, 2016, pp. 1-4.
Screenshots of YouTube video at https://www.youtube.com/watch?v=jK-jKL7QeWE ; uploaded Aug. 19, 2010, pp. 1-12.
One Screenshot of YouTube Video; https://www.youtube.com/watch?v=jK_jKL7QeWE ; uploaded Aug. 19, 2010, 1 page.
Opposition to Australian Patent Application No. 2013233969, "Statement of Grounds and Particulars", Dec. 27, 2016, pp. 1-46.

* cited by examiner

SYSTEM FOR MAKING BEVERAGES

This invention relates to a system for making beverages.

In particular, it relates to a system for making beverages based on capsules containing a powdered food substance (for example coffee powder) which can be extracted by passing water through it to make a beverage (for example coffee). Prior art systems comprise a capsule holder into which the capsule is inserted. In some systems, inserted inside the capsule holder there are blades which allow the base of the capsule to be torn, making an opening through which the water can enter the capsule to interact with the food substance. The capsule also generally has a lid which allows the beverage out through it under suitable conditions. In fact, the lid may be of various types, for example simply pierced or in contrast consisting of a metal sheet which can be torn against projecting elements as the pressure in the capsule increases above a predetermined threshold value.

Once the opening has been made in the base, the water can be injected into the capsule. However, the presence of the powdered food substance in the capsule creates resistance to the passage of the water, which may therefore partly come out of the capsule through the opening and penetrate between the capsule and the capsule holder, causing water to leak out of the system and incorrect extraction of the beverage. To prevent that, in the prior art system there are therefore sealing means for creating a watertight seal between the capsule and the capsule holder. These sealing means in particular usually create the watertight seal between the capsule holder and a sealing member on the surface of the capsule which is generally at an edge of the capsule. Patent EP 1816936 B1 describes for example a system in which the capsule is equipped with a compressible and resilient sealing member which is compressed when it is coupled with the edge of the capsule holder.

In contrast, patent EP 1700548 B1 describes a capsule suitable for insertion in a system for making beverages which comprises, on its outer surface, a hollow sealing member for achieving a watertight seal effect. The sealing member may be deformable, for example thanks to its geometric shape.

In addition, patent EP 1654966 B1 describes a capsule made to be inserted in a system for making beverages and on whose outer surface there is a resilient sealing member made of a material which is different to that of the capsule, rubbery and elastic, for example silicone.

Patent EP 1816935 B1 describes a system in which the sealing member (which may be resilient) is compressed when it is coupled with the capsule holder for creating a watertight seal between the capsule holder and the capsule.

Finally, patent EP 1702543 B1 describes an alternative embodiment of it, with a system in which the capsule holder is equipped with at least one air passage in such a way that the sealed coupling with the sealing member is only effective as long as the capsule holder applies a minimum axial pressure on the capsule (and in particular on the sealing member itself) and such that the coupling is automatically released as soon as the pressure applied by the capsule holder drops below a minimum pressure. In this case, the contact surface of the capsule holder with the capsule is a substantially annular edge on which the air passages are made which form indentations.

However, this prior art technology has several disadvantages.

The indentations present on the edge of the capsule holder mean that a seal can only be formed with a capsule at whose edge there is a resilient sealing member into which the indentations of the capsule holder can sink.

Moreover, the watertight seal between the capsule and the capsule holder is created by the axial pressure of the capsule holder on the capsule at the resilient sealing member. The pressure needed for the seal must therefore be very precisely calibrated and must be sufficient to create the seal but not excessive, so that it then allows the capsule to be detached from the capsule holder.

In addition, the capsule and the resilient sealing member require significant construction precision. The level of sophistication of the construction techniques may affect production costs.

Furthermore, the use of a sealing member made of a material which is different to that of the capsule means an increase in production costs.

In this context, the technical purpose which forms the basis of this invention is to provide a system for making beverages which overcomes the above-mentioned disadvantages.

In particular, the technical purpose of this invention is to provide a system for making beverages which allows the creation of a watertight seal which is an alternative to those described above.

A further technical purpose of this invention is to provide a system for making beverages which allows the creation of a watertight seal between the capsule and the capsule holder irrespective of the presence or absence of the indentations or passages on the annular edge of the capsule holder.

Another technical purpose of this invention is to provide a system for making beverages which creates a watertight seal between the capsule and the capsule holder which allows reduced dependence of the seal on the axial pressure applied by the capsule holder on the capsule.

Yet another technical purpose of this invention is to provide a system for making beverages which allows the creation of a watertight seal between the capsule and the capsule holder which simplifies the construction process and which does not require excessive construction precision, thereby reducing production costs.

The technical purpose specified and the aims indicated are substantially achieved by a system for making beverages as described in the appended claims.

Further features and the advantages of this invention are more apparent in the detailed description, with reference to the accompanying drawings which illustrate several preferred, non-limiting embodiments of a system for making beverages, in which.

Figure 1:
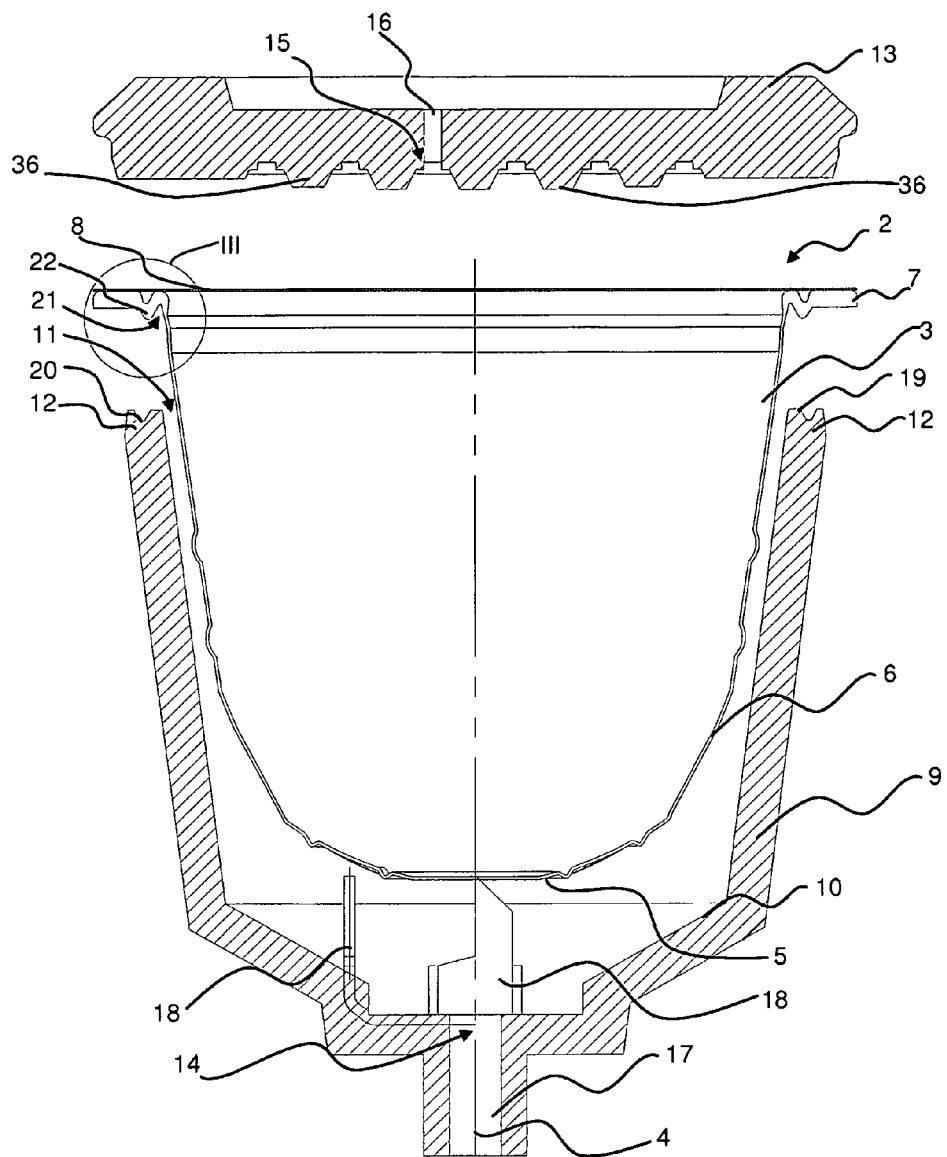
FIG. 1 is an axial section of the system according to this invention.
Figure 2:
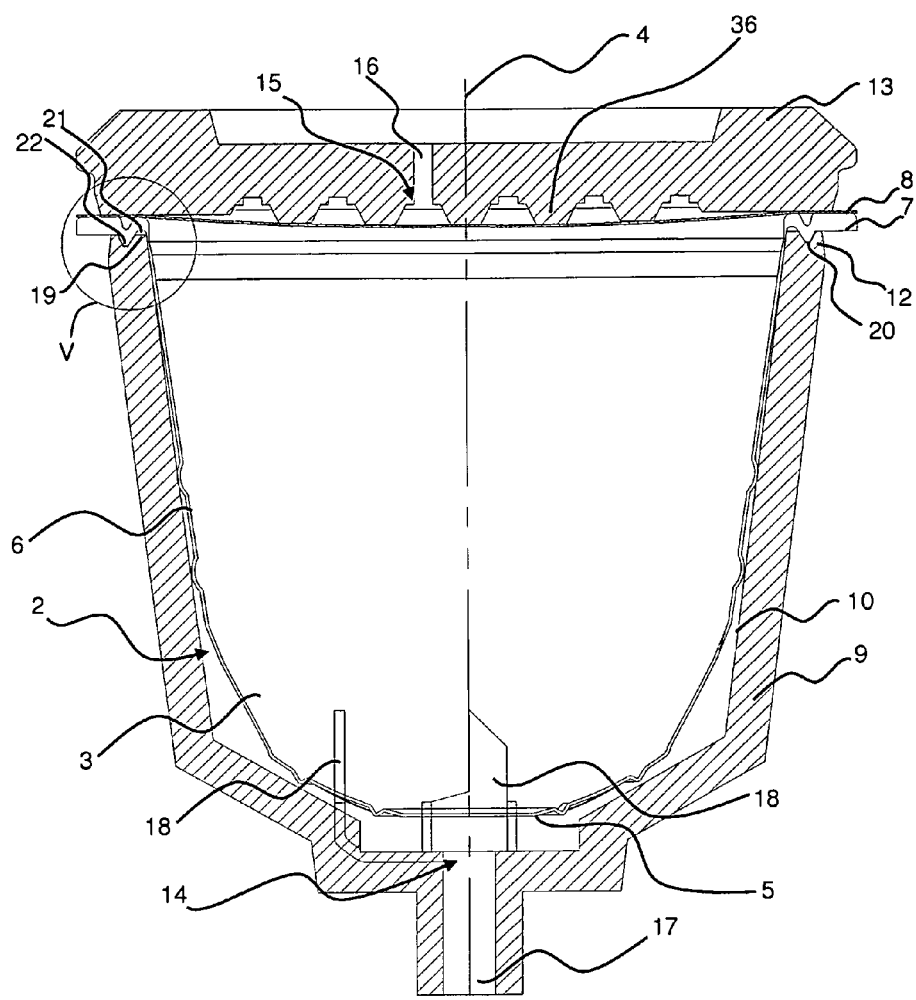
FIG. 2 is an axial section of the system of FIG. 1, in a closed position.

It should be noticed that for greater clarity, in the accompanying drawings several lines are shown which refer to elements that are in the background relative to the cross-section plane (such as the annular extensions around the axis).

With reference to said figures, the numeral 1 denotes in its entirety a system for making beverages in accordance with this invention.

The system 1 according to this invention comprises a capsule 2 containing at least one powdered food substance (for example coffee powder) which can be extracted by passing pressurised water through it to make a beverage (for example coffee). In the context of this invention, the term powdered food substance refers to any substance which can be extracted by infusion or which is soluble, for example coffee, tea, infusions, soups, etc.

The capsule 2 comprises a substantially cup-shaped body 3 which has a central axis 4. Basically, the body 3 of the capsule 2 is preferably a rotation solid whose axis is the above-mentioned central axis 4. The body 3 comprises a lower wall 5, a lateral wall 6 extending from the lower wall 5, and, at the opposite end of the lateral wall 6 to the lower wall 5 (upper end), a perimetric edge 7 projecting outwards from the lateral wall 6. The body 3 of the capsule 2 may be made of various materials such as plastic materials, for example by injection moulding or thermoforming, or metals.

The capsule 2 also comprises a lid 8 associated with the perimetric edge. 7 for closing the top of the body 3. The lid 8 may be made of aluminium film, plastic film or laminated material.

The system 1 also comprises a capsule holder 9 forming a housing 10 inside it for accommodating the capsule 2. The capsule 2 can be inserted in the housing 10 through an infeed opening 11 in the capsule holder 9 which is delimited at its perimeter by an annular edge 12 of the capsule holder 9. In use, the capsule holder 9 and the capsule 2 can adopt a sealed configuration in which the capsule 2 is inserted in the housing 10 and the annular edge 12 of the capsule holder 9 is in contact with the capsule 2 and is coupled with it with a watertight seal.

The watertight seal is advantageously obtained by the relative movement between the capsule holder 9 and a contact element 13, which is also part of the system 1, on which the lid 8 of the capsule 2 can rest at least at the perimetric edge 7. In particular, at least one out of the capsule holder 9 and the contact element 13 is movable relative to the other between an open position, in which they allow insertion of the capsule 2 in the housing 10 through the infeed opening 11, and a closed position in which, with the capsule holder 9 and the capsule 2 in the sealed configuration, between them they close the perimetric edge 7 of the capsule 2. In the open position the capsule 2 can be positioned between the capsule holder 9 and the contact element 13 and the capsule 2 is inserted in the housing 10 after reaching the closed position in the substantially known way. In the closed position, a watertight seal is also created between the capsule 2 and the contact element 13 to prevent the beverage from leaking out of the system 1. Advantageously, this watertight seal is created at least between the portion of the lid 8 of the capsule 2 at the perimetric edge 7 and the contact element 13.

The system 1 also comprises injection means 14 mounted in the capsule holder 9 for injecting pressurised water into the capsule 2 through the lower wall 5 and collecting means 15 for collecting the beverage dispensed through the lid 8 of the capsule 2.

The collecting means 15 comprise at least one collecting duct 16 for conveying and collecting the beverage which is dispensed through the lid. 8 of the capsule 2 and for carrying it towards the outside of the system 1 at a drop point (not illustrated). Advantageously, they are associated with the contact element 13 and in particular the collecting duct 16 is at least partly made in the contact element 13 itself. Therefore, in the closed position the watertight seal between the capsule 2 and the contact element 13 allows the collecting means 15 to collect substantially all of the beverage dispensed through the lid 8 of the capsule 2. The beverage may be dispensed through the lid 8 of the capsule 2 in various ways (of the known type). For example, if the lid 8 of the capsule 2 is pierced and comprises one or more through holes, the beverage is dispensed through the holes. If, in contrast, as in the embodiment illustrated, the lid 8 consists for example of a breakable metal sheet, then the contact element 13 will advantageously comprise projecting elements 36 against which the lid 8 can tear as the pressure inside the capsule 2 increases above a predetermined threshold value, following insertion of water by the injection means 14.

In contrast, the injection means 14 comprise one or more injecting pipes 17 which allow water to be injected into the capsule 2 through the lower wall 5 of the capsule 2 itself. Water is injected when the capsule 2 and the capsule holder 9 are in the sealed configuration, in such a way that water does not come out of the capsule holder 9.

In a first embodiment the lower wall 5 of the capsule 2 comprises holes for the passage of water into the capsule 2. In this way, the simple supply of pressurised water into the capsule holder 9, through the injecting pipe 17, allows said water to pass into the capsule 2.

In contrast, in a second embodiment the lower wall 5 of the capsule 2 does not have any holes in it and allows the water to enter the capsule 2 after it has been pierced or torn. Therefore, advantageously, as in the case of the embodiment illustrated, the injection means 14 comprise, in the known way, blades 18 or the like which are preferably fixed to the capsule holder 9 and designed to tear or pierce the lower wall 5 of the capsule 2 for creating at least one opening to allow the water into the capsule 2. The blades 18 or the like may advantageously be hollow and inside them may form part of the injecting pipe 17 which allows water to be injected into the capsule 2 through the tear made by the blades 18. In the embodiment illustrated, the injection means 14 comprise blades 18 which allow cutting (tearing) of the lower wall 5 of the capsule 2 and the water is simply supplied into the capsule holder 9 through an injecting pipe 17.

Tearing takes place at least when the capsule 2 is completely inserted in the housing 10. Advantageously, the contact between the injection means 14 (and in particular the blades 18) and the lower wall 5 of the capsule 2 and the tearing action occur, in the known way, due to the relative movement between the capsule 2 and the injection means 14 which, as said, are advantageously fixed to the capsule holder 9. Advantageously, the relative movement between the capsule 2 and the capsule holder 9 is obtained, in the known way, thanks to the presence of the contact element 13. In fact, in the relative movement the capsule holder 9 pushes the capsule 2 towards the contact element 13 until the lid 8 of the capsule 2, at least at the perimetric edge 7, makes impact against the contact element 13 and at that point, during achievement of the closed position or at the closed position, the injection means 14 and in particular the blades 18, pierce the lower wall 5 of the capsule 2.

As said, in the sealed configuration, the capsule holder 9 and the capsule 2 are coupled with each other with a watertight seal. Advantageously, the sealed coupling occurs at the annular edge 12 of the capsule holder 9. In particular, at the top of the annular edge 12 of the capsule holder 9 there is a projecting annular element 19 and/or respectively an annular seat 20. In contrast, on the perimetric edge 7, on the opposite side to that associated with the lid 8 of the capsule 2, there is respectively an annular groove 21 and/or an annular tooth 22. In the sealed configuration the projecting annular element 19 is inserted in the annular groove 21 and/or respectively the annular seat 20 receives inside it the annular tooth 22. Therefore, in accordance with this invention it is possible that only the projecting annular element 19 and the annular groove 21 are present, or only the annular seat 20 and the annular tooth 22 are present, or the projecting annular element 19, the annular seat 20, the annular tooth 22 and the annular groove 21 are present.

In those cases in which the annular groove 21 is present, on its surface there are three portions annularly arranged relative to the central axis 4, consisting of a bottom zone 23 and two inner lateral faces 24, 25 which are laterally positioned on opposite sides of the bottom zone 23. In the sealed configuration the projecting annular element 19 is in sealed contact with at least one of the inner lateral faces 24, 25 of the annular groove 21. That is to say, the projecting annular element 19 and the annular groove 21 are shaped in such a way that the force applied between the projecting annular element 19 and the annular groove 21, responsible for the seal, at each contact point has a component transversal to the axial direction (that is to say a direction parallel with the central axis 4) and substantially perpendicular to the inner lateral face or faces 24, 25 with which the projecting annular element 19 is in contact.

In particular, advantageously, the inner lateral faces 24, 25 are angled relative to the direction defined by the central axis 4 and converge towards one another as they approach the bottom zone 23.

Moreover, advantageously, even on the surface of the projecting annular element 19 there are three portions consisting of a top portion 26 and two outer lateral portions 27, 28 which are laterally positioned on opposite sides of the top portion 26. In this case, the watertight seal is guaranteed by lateral contact between the outer lateral portion 27 furthest from the central axis 4 and the inner lateral portion 24 furthest from the central axis 4, and/or by lateral contact between the outer lateral portion 28 closest to the central axis 4 and the inner lateral face 25 closest to the central axis 4.

In particular, advantageously, the outer lateral portions 27, 28 are angled relative to the direction defined by the central axis 4 and converge towards one another as they approach the top portion 26.

In those cases in which the annular tooth 22 is present, on its surface there are three portions annularly arranged relative to the central axis 4, consisting of a tip portion 29 and two outer lateral faces 30, 31 which are am laterally positioned on opposite sides of the tip portion 29. In the sealed configuration the annular seat 20 is in sealed contact with at least one of the outer lateral faces 30, 31 of the annular tooth 22.

Again in this case, the annular seat 20 and the annular tooth 22 are shaped in such a way that the force applied between the annular seat 20 and the annular tooth 22, responsible for the seal, at each contact point has a component transversal to the axial direction and substantially perpendicular to the outer lateral face or faces 30, 31 with which the annular seat 20 is in contact.

In particular, the outer lateral faces 30, 31 are advantageously angled relative to the direction defined by the central axis 4 and converge towards one another as they approach the tip portion 29.

Advantageously, even on the surface of the annular seat 20 there are three portions consisting of a bottom portion 32 and two inner lateral portions 33, 34 which are laterally positioned on opposite sides of the bottom portion 32. In this case, the watertight seal is guaranteed by lateral contact between the outer lateral face 30 furthest from the central axis 4 and the inner lateral portion 33 furthest from the central axis 4, and/or by lateral contact between the outer lateral face 31 closest to the central axis 4 and the inner lateral portion 34 closest to the central axis 4.

In particular, the inner lateral portions 33, 34 are advantageously angled relative to the direction defined by the central axis 4 and converge towards one another as they approach the bottom portion 32.

Therefore, in all cases the watertight seal is created laterally. In other words, the forces applied between the projecting annular element 19 and the annular groove 21 and/or respectively between the annular seat 20 and the annular tooth 22 have a component which is transversal to the axial direction and substantially perpendicular to the angled surfaces which are in contact with one another.

As already indicated, in the closed position, the capsule holder 9 and the capsule 2 are in the sealed configuration. In particular, in the sealed configuration the perimetric edge 7 of the capsule 2 and the annular edge 12 of the capsule holder 9 are coupled. During the coupling the annular edge 12 of the capsule holder 9 may cause deformations in the capsule 2. In fact, the capsule 2, as already indicated, may be made for example of plastic or metal material which is more yielding than that of the capsule holder 9, and may be subject to plastic or elastic deformations after insertion of the projecting annular element 19 in the annular groove 21 and/or of the annular tooth 22 in the annular seat 20. In the sealed configuration the annular groove 21 and/or respectively the annular tooth 22 may be elastically or plastically deformed at least at one of the respective lateral faces 24, 25, 30, 31 to improve the seal.

Figure 3:
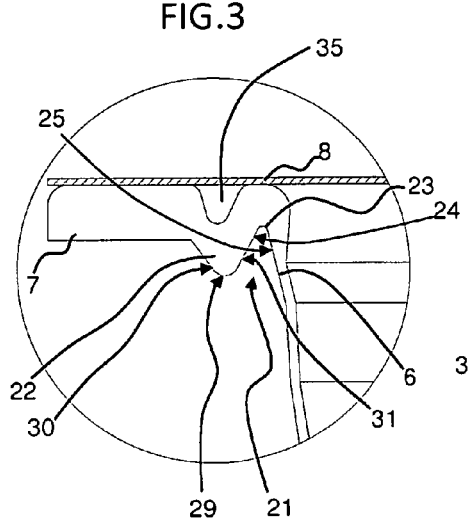
FIG. 3 shows the detail III of FIG. 1.
Figure 4:
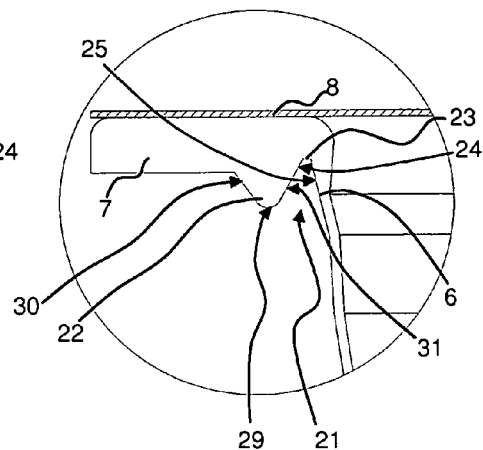
FIG. 4 illustrates an alternative embodiment of the detail of FIG. 3.
Figure 5:
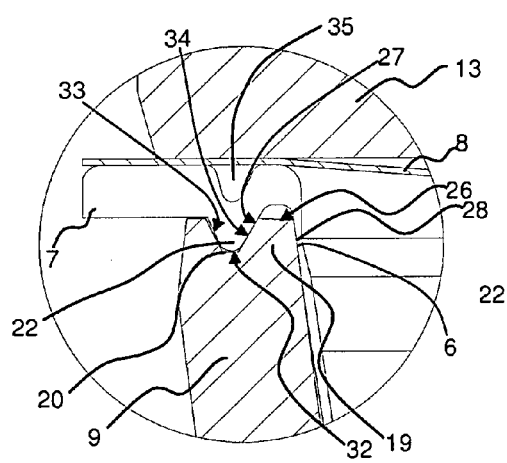
FIG. 5 shows the detail V of FIG. 2.
Figure 6:
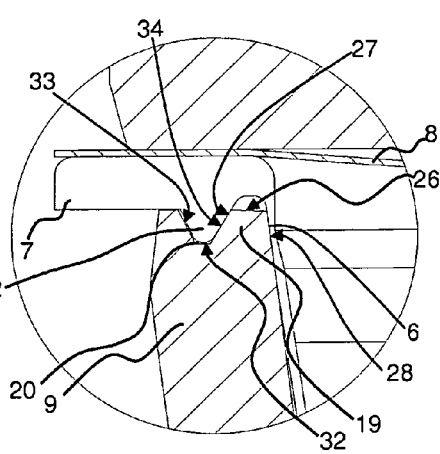
FIG. 6 illustrates an alternative embodiment of the detail of FIG. 5.

The embodiment illustrated shows the deformation of the annular groove 21 as it passes to the sealed configuration. In particular, when the capsule 2 is not coupled with the capsule holder 9, the annular groove 21 does not have any deformation (FIGS. 3 and 4). In contrast, in the sealed configuration the projecting annular element 19 is inserted in the annular groove 21, advantageously creating a deformation in it with consequent widening of it (FIGS. 5 and 6). Advantageously, as is the case of the embodiment illustrated, the inner lateral face 25 of the annular groove 21 closest to the central axis 4 may be part of the lateral wall 6 of the body 3 of the capsule 2. Therefore, the annular groove 21 would be substantially made at the connecting zone between the lateral wall 6 and the perimetric edge 7 of the capsule 2. In fact, in the embodiment illustrated, in the sealed configuration the lateral wall 6 of the capsule 2 close to the annular groove 21 is deformed (pressed towards the inside of the capsule 2) after coupling of the annular groove 21 with the projecting annular element 19.

However, in general, both the annular groove 21 and the annular tooth 22 may be deformed in the sealed configuration. In particular, the deformation would occur due to sealed coupling of the capsule 2 with the capsule holder 9 and could involve the bottom zone 23, the tip portion 29, the inner lateral faces 24, 25 and the outer lateral faces 30, 31.

Advantageously, in the event of elastic deformation of the capsule 2, the capsule 2 itself will contribute to generating on the capsule holder 9 components of force which are transversal to the axial direction.

The annular groove 21 and the annular tooth 22 may be made in different ways. In the preferred embodiment, the annular tooth 22 is made by folding back on itself the perimetric edge 7 of the capsule 2, that is to say, at the annular tooth 22, on the side of the perimetric edge 7 towards the lid 8 of the capsule 2, there is an empty space 35 (FIGS. 3 and 5). This empty space 35 may promote the deformability of the annular groove 21 and of the annular tooth 22 as well as their elasticity.

Alternatively the annular tooth 22 may simply be a protuberance projecting from the bottom of the perimetric edge 7 of the capsule 2 and consequently also defines, with the lateral wall 6, the annular groove 21 (FIGS. 4 and 6). In this case the annular tooth 22 does not define substantially any empty space between it and the lid 8.

Therefore, in accordance with this invention, it is not necessary for the watertight seal to be created at the bottom zone 23 and/or respectively at the tip portion 29. In this way the watertight seal is also guaranteed when for example the annular edge 12 of the capsule holder 9 has the surface with indentations and the capsule 2 is not provided with resilient sealing members. Moreover, in this way the watertight seal is also guaranteed in cases in which the top portion 26 of the annular edge 12 is ruined, for example following wear, and therefore the axial sealed coupling could no longer be guaranteed.

As already indicated, in a first embodiment, at the annular edge 12 of the capsule holder 9 only the projecting annular element 19 is identified. Advantageously, in this case the projecting annular element 19 may consist of the entire thickness of the annular edge 12 of the capsule holder 9. In turn, the capsule 2 has at its perimetric edge 7 only the annular groove 21 and the sealed contact occurs between at least one of the inner lateral faces 24, 25 of the annular groove 21 and at least one of the outer lateral portions 27, 28 of the projecting annular element 19. In this way, the watertight seal is created irrespective of the shape of the surface of the annular edge 12 of the capsule holder 9 at the top portion 26 or the presence of any irregularities on it. In fact, as already indicated, in some cases the surface of the annular edge 12 at the top portion 26 may have indentations or irregularities in it. This principle also applies for the second embodiment described below. It should be noticed that if the top portion 26 has indentations in it, the part visible in the accompanying drawings would correspond to a portion located between two teeth positioned one after another (in other words, the indentations would extend upwards with reference to the top portions 26 illustrated in the accompanying drawings).

In a second embodiment illustrated in the accompanying drawings, on the annular edge 12 there are both the projecting annular element 19 and the annular seat 20 and on the perimetric edge 7 there are both the annular groove 21 and the annular tooth 22. Again in this case the inner lateral face 25 of the annular groove 21 closest to the central axis 4 may advantageously be part of the lateral wall 6 of the body 3 of the capsule 2. Moreover, advantageously, the annular tooth 22 is positioned in a position radially further from the central axis 4 than the annular groove 21 and the annular seat 20 is positioned radially further from the central axis 4 than the projecting annular element 19. In the sealed configuration the annular tooth 22 is inserted in the annular seat 20 and the projecting annular element 19 is inserted in the annular groove 21.

The annular seat 20 and the projecting annular element 19 and respectively the annular groove 21 and the annular tooth 22 can be separate and distanced from each other. However, advantageously, the annular seat 20 and the annular groove 21 respectively share an inner lateral portion 34 and an inner face 24 with respectively the projecting annular element 19 and the annular tooth 22. In more detail, the inner lateral face 24 of the surface of the annular groove 21 which is radially furthest from the central axis 4 corresponds to the outer lateral face 31 of the surface of the annular tooth 22 closest to the central axis 4, and the outer lateral portion 27 of the surface of the projecting annular element 19 which is furthest from the central axis 4 corresponds to the inner lateral portion 34 of the surface of the annular seat 20 which is closest to the central axis 4.

Looking in more detail at operation of the system 1 for making beverages according to this invention, the capsule 2 is inserted in the housing 10 made in the capsule holder 9, through the infeed opening 11 delimited by the annular edge 12 of the capsule holder 9. The relative movement between the capsule holder 9 and the contact element 13 causes the lid 8 of the capsule 2 to make impact against the contact element 13 at least at the perimetric edge 7 of the capsule 2. Moreover, movement of the capsule holder 9 towards the contact element 13 causes the closed position to be reached and insertion of the injection means 14 in the capsule 2 (that is to say, tearing of the lower wall 5 of the capsule 2 by the blades 18). Advantageously, in the closed position the watertight seal is created between the capsule 2 and the capsule holder 9, at the annular edge 12 of the capsule holder 9, and between the capsule 2 and the contact element 13, at the zone of contact between the lid 8 of the capsule 2 and the contact element 13 (which advantageously occurs at least at the portion of the lid 8 which is in contact with the perimetric edge 7 of the capsule 2). Therefore, the perimetric edge 7 of the capsule 2 is advantageously clamped between the contact element 13 and the capsule holder 9. However, as already indicated, advantageously the sealed coupling between the capsule 2 and the capsule holder 9 occurs, depending on the embodiment, exclusively at one of the lateral faces 24, 25 30, 31 or one of the annular lateral portions 27, 28 33, 34 respectively of the annular groove 21, the annular tooth 22, the projecting annular element 19 and the annular seat 20.

This invention brings important advantages.

First, the watertight seal between the capsule and the capsule holder, being created laterally, that is to say, depending on the embodiment, occurring at the annular lateral portions respectively of the first tooth, the groove, the seat and the second tooth, allows the watertight seal to be created even when the surface of the capsule holder has indentations in it or is uneven and the capsule is not equipped with a resilient sealing member suitable for compressing them.

Secondly, since the watertight seal between the capsule and the capsule holder is created at the lateral portions or lateral faces, there is a reduction in seal dependence on axial pressure.

Thirdly, the type of watertight seal created between the capsule and the capsule holder does not require sophisticated techniques nor excessive checks on construction tolerances. In fact, since the sealed coupling is created between the projecting annular element and the groove or the sealed coupling between the annular seat and the annular tooth is not created respectively at the bottom zone, the tip zone, the bottom portion or the top portion, but rather is created at the lateral portions and the lateral faces and advantageously with the possibility of deformation, there is no need for the seat and the second tooth or the groove and the second tooth to perfectly complement one another axially.

Finally, it should be noticed that this invention is relatively easy to produce and that even the cost linked to implementing the invention is not very high.

The invention described above may be modified and adapted in several ways without thereby departing from the scope of the inventive concept. Moreover, all details of the invention may be substituted with other technically equivalent elements and the materials used, as well as the shapes and dimensions of the various components, may vary according to requirements.

The invention claimed is:

1. A system for making beverages, comprising a capsule (2) containing at least one powdered food substance which can be extracted by passing pressurised water through it to make a beverage, the capsule (2) comprising a substantially cup-shaped body (3) having a central axis (4), the body (3) comprising a lower wall (5), a lateral wall (6) extending from the lower wall (5), and, at the opposite end of the lateral wall (6) to the lower wall (5), a perimetric edge (7) projecting outwards from the lateral wall (6) and being integral and a single piece with the lateral wall (6), the capsule (2) also comprising a lid (8) associated with the perimetric edge (7) for closing the top of the body (3);

a capsule holder (9) forming a housing (10) inside it for accommodating the capsule (2), the capsule holder (9) comprising an infeed opening (11) through which the capsule (2) can be inserted in the housing (10), the infeed opening (11) being delimited at its perimeter by an annular edge (12) of the capsule holder (9) at the top of which there is a projecting annular element (19) and/or respectively an annular seat (20), injection means (14) mounted in the capsule holder (9) for in use injecting pressurised water into the capsule (2) through the lower wall (5);

collecting means (15) for in use collecting the beverage dispensed through the lid (8) of the capsule (2);

the perimetric edge (7) of the body (3), on the opposite side to that where the lid (8) of the capsule (2) is associated, defining an annular groove (21) on whose surface there are three portions annularly arranged relative to the central axis (4), consisting of a bottom zone (23) and two inner lateral faces (24, 25) which are laterally positioned on opposite sides of the bottom zone (23), and/or respectively defining an annular tooth (22) on whose surface there are three portions annularly arranged relative to the central axis (4), consisting of a tip portion (29) and two outer lateral faces (30, 31) which are laterally positioned on opposite sides of the tip portion (29);

the capsule holder (9) and the capsule (2) being able to adopt a sealed configuration in which the annular edge (12) is in contact with the capsule (2) and is connected to it with a watertight seal, the annular groove (21) and/or respectively the annular tooth (22) being defined by the perimetric edge (7) even when the capsule (2) is outside the housing (10) of the capsule holder (9) and the capsule (2) is not in the sealed configuration;

in the sealed configuration the projecting annular element (19) being inserted in the annular groove (21) and being in sealed contact with at least one of the inner lateral faces (24, 25), and/or respectively the annular seat (20) receiving inside it the annular tooth (22) and being in sealed contact with at least one of the outer lateral faces (30, 31).

2. The system according to claim 1, wherein the inner lateral face (25) of the annular groove (21) closest to the central axis (4) is part of the lateral wall (6) of the body (3) of the capsule (2).

3. The system according to claim 1, wherein on the surface of the projecting annular element (19) there are three portions consisting of a top portion (26) and two outer lateral portions (27, 28) which are laterally positioned on opposite sides of the top portion (26), and wherein respectively on the surface of the annular seat (20) there are three portions comprising a bottom portion (32) and two inner lateral portions (33, 34) which are laterally positioned on opposite sides of the bottom portion (32).

4. The system according to claim 3, wherein the inner lateral faces (24, 25) are angled relative to the direction defined by the central axis (4) and converge towards the bottom zone (23) and/or the outer lateral faces (30, 31) are angled relative to the direction defined by the central axis (4) and converge towards the tip portion (29), and wherein the outer lateral portions (27, 28) are angled relative to the direction defined by the central axis (4) and converge towards the top portion (26) and/or the inner lateral portions (33, 34) are angled and converge towards the bottom portion (32).

5. The system according to claim 1, wherein in the sealed configuration the annular groove (21) and/or the annular tooth (22) are deformed at least at respectively at least one of the inner lateral faces (24, 25) and/or respectively at least one of the outer lateral faces (30, 31).

6. The system according to claim 3, wherein in the sealed configuration the watertight seal is obtained by lateral contact between the outer lateral face (30) furthest from the central axis (4) and the inner lateral portion (33) furthest from the central axis (4), and/or by lateral contact between the outer lateral face (31) closest to the central axis (4) and the inner lateral portion (34) closest to the central axis (4), and/or by lateral contact between the outer lateral portion (27) furthest from the central axis (4) and the inner lateral face (24) furthest from the central axis (4), and/or by lateral contact between the outer lateral portion (28) closest to the central axis (4) and the inner lateral face (25) closest to the central axis (4).

7. The system according to claim 1, wherein on the annular edge (12) there are both the projecting annular element (19) and the annular seat (20) and on the perimetric edge (7) there are both the annular groove (21) and the annular tooth (22).

8. The system according to claim 7, wherein the annular tooth (22) is positioned in a position radially further from the central axis (4) than the annular groove (21), wherein the annular seat (20) is positioned radially further from the central axis (4) than the projecting annular element (19) and wherein in the sealed configuration the annular tooth (22) is inserted in the annular seat (20) and the projecting annular element (19) is inserted in the annular groove (21).

9. The system according to claim 8, wherein the inner lateral face (24) of the surface of the annular groove (21) which is radially furthest from the central axis (4) corresponds to the outer lateral face (31) of the surface of the annular tooth (22) closest to the central axis (4), and wherein the outer lateral portion (27) of the surface of the projecting annular element (19) which is furthest from the central axis (4) corresponds to the inner lateral portion (34) of the surface of the annular seat (20) which is closest to the central axis (4).

10. The system according to claim 1, wherein in the sealed configuration the annular groove (21) and/or the annular tooth (22) are elastically or plastically deformed at least at one of the respective inner (24, 25) and/or outer (30, 31) lateral faces.

11. The system according to claim 1, wherein it also comprises a contact element (13) on which the lid (8) of the capsule (2) can rest, in the sealed configuration, at least at the perimetric edge (7) and with which the collecting means (15) are associated, and wherein at least one out of the capsule holder (9) and the contact element (13) is movable relative to the other between an open position in which the capsule (2) can be inserted in the housing (10) through the infeed opening (11) and a closed position in which, with the capsule holder (9) and the capsule (2) in the sealed configuration, between them they close the perimetric edge (7) of the capsule (2) to form a watertight seal even between at least the perimetric edge (7) and the contact element (13) for in use allowing the collecting means (15) to substantially collect all of the beverage dispensed through the lid (8) of the capsule (2).

12. The system according to claim 2, wherein on the surface of the projecting annular element (19) there are three portions consisting of a top portion (26) and two outer lateral portions (27, 28) which are laterally positioned on opposite sides of the top portion (26), and wherein respectively on the surface of the annular seat (20) there are three portions comprising a bottom portion (32) and two inner lateral portions (33, 34) which are laterally positioned on opposite sides of the bottom portion (32).

13. The system according to claim 2, wherein on the annular edge (12) there are both the projecting annular element (19) and the annular seat (20) and on the perimetric edge (7) there are both the annular groove (21) and the annular tooth (22).

14. The system according to claim 3, wherein on the annular edge (12) there are both the projecting annular element (19) and the annular seat (20) and on the perimetric edge (7) there are both the annular groove (21) and the annular tooth (22).

15. The system according to claim 5, wherein on the annular edge (12) there are both the projecting annular element (19) and the annular seat (20) and on the perimetric edge (7) there are both the annular groove (21) and the annular tooth (22).

16. The system according claim 2, wherein in the sealed configuration the annular groove (21) and/or the annular tooth (22) are elastically or plastically deformed at least at one of the respective inner (24, 25) and/or outer (30, 31) lateral faces.

17. The system according claim 3, wherein in the sealed configuration the annular groove (21) and/or the annular tooth (22) are elastically or plastically deformed at least at one of the respective inner (24, 25) and/or outer (30, 31) lateral faces.

18. The system according to claim 5, wherein in the sealed configuration the annular groove (21) and/or the annular tooth (22) are elastically or plastically deformed at least at one of the respective inner (24, 25) and/or outer (30, 31) lateral faces.

19. The system according to claim 7, wherein in the sealed configuration the annular groove (21) and/or the annular tooth (22) are elastically or plastically deformed at least at one of the respective inner (24, 25) and/or outer (30, 31) lateral faces.

* * * * *